United States Patent
Ono (10) Patent No.: US 9,124,876 B2
(45) Date of Patent: *Sep. 1, 2015

(54) PUPIL-DIVIDING IMAGING APPARATUS (71) Applicant: FUJIFILM Corporation, Tokyo (JP)

(72) Inventor: Shuji Ono, Kanaawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,683

(22) Filed: Feb. 11, 2014

(65) Prior Publication Data

US 2014/0176681 A1 Jun. 26, 2014

Related U.S. Application Data

(63) Continuation of application No. PCT/JP2012/067785, filed on Jul. 12, 2012.

(30) Foreign Application Priority Data

Aug. 23, 2011 (JP) ................................. 2011-181832

(51) Int. Cl.
*H04N 13/02* (2006.01)
*G03B 13/36* (2006.01)
*G03B 35/08* (2006.01)
*G02B 3/10* (2006.01)
(Continued)

(52) U.S. Cl.
CPC .............. *H04N 13/0217* (2013.01); *G02B 3/10* (2013.01); *G03B 13/36* (2013.01); *G03B 35/08* (2013.01); *G02B 7/34* (2013.01); *H04N 5/3696* (2013.01)

(58) Field of Classification Search
CPC .......... H04N 5/23212; H04N 13/0217; H04N 13/0225; H04N 13/0207; H04N 5/3696; G03B 13/36; G03B 35/08; G02B 7/34; G02B 3/10
See application file for complete search history.

(56) References Cited

U.S. PATENT DOCUMENTS 4,410,804 A * 10/1983 Stauffer ...................... 250/208.2
4,902,115 A    2/1990 Takahashi
5,051,830 A *  9/1991 von Hoessle ................. 348/335
(Continued)

FOREIGN PATENT DOCUMENTS

JP       63-078119     4/1988
JP       2003-309723   10/2003
(Continued)

OTHER PUBLICATIONS

International Search Report dated Aug. 14, 2012 in corresponding Japanese Patent Application No. PCT/JP2012/067785.
(Continued)

*Primary Examiner* — Luong T Nguyen
(74) *Attorney, Agent, or Firm* — Young & Thompson (57) ABSTRACT

In an imaging apparatus according to an aspect of the present invention, the light-shielding member performing light shielding so that the light beam passing through the second region does not enter the first light-receiving element is provided only to the first light-receiving element. That is, no light-shielding member is provided to the second light-receiving element. Therefore, the number and types of light-shielding members can be reduced, and pupil division can be performed with a simple structure. Also, various products can be easily supported.

16 Claims, 9 Drawing Sheets

(51) Int. Cl.
*H04N 5/369* (2011.01)
*G02B 7/34* (2006.01)

(56) References Cited

U.S. PATENT DOCUMENTS

| | | | |
|---|---|---|---|
| 8,405,760 B2 * | 3/2013 | Yamasaki | 348/349 |
| 8,564,702 B2 * | 10/2013 | Takagi et al. | 348/294 |
| 2009/0284727 A1 | 11/2009 | Muramatsu et al. | |
| 2010/0149389 A1 | 6/2010 | Goto | |
| 2011/0026005 A1 | 2/2011 | Kiuchi | |
| 2011/0063484 A1 | 3/2011 | Fujii et al. | |

FOREIGN PATENT DOCUMENTS

| | | | |
|---|---|---|---|
| JP | 2007-306406 | * | 11/2007 |
| JP | 2007312311 | | 11/2007 |
| JP | 2010128122 | | 6/2010 |
| JP | 2010-147143 | | 7/2010 |
| JP | 2010-210903 | | 9/2010 |
| JP | 2010-212649 | | 9/2010 |
| JP | 2011-095027 | | 5/2011 |
| JP | 2011124712 | | 6/2011 |
| WO | 2009107705 | | 3/2009 |
| WO | 2009107705 | | 9/2009 |

OTHER PUBLICATIONS

Information Disclosure Statement, dated Jan. 28, 2014, in co-pending U.S. Appl. No. 14/166,341.
Information Disclosure Statement, dated May 15, 2015 in co-pending U.S. Appl. No. 14/166,341.
Notice of References PTO-892, dated Nov. 5, 2014, in co-pending U.S. Appl. No. 14/166,341.
Information Disclosure Statement, dated Jun. 9, 2015 in co-pending U.S. Appl. No. 14/166,341.

* cited by examiner

PUPIL-DIVIDING IMAGING APPARATUS

CROSS REFERENCE TO RELATED APPLICATIONS

This application is a continuation of PCT/JP2012/067785 filed on Jul. 12, 2012, which claims foreign priority to Japanese Application No. 2011-181832 filed on Aug. 23, 2011. The entire contents of each of the above applications are hereby incorporated by reference.

BACKGROUND OF THE INVENTION

1. Field of the Invention

The present invention relates to imaging apparatuses and, in particular, an imaging apparatus capable of simultaneously obtaining various images.

2. Description of the Related Art

Japanese Patent Application Laid-Open No. 2010-210903 describes a focus detection optical system of a pupil-division-type phase difference detection type including paired focus detecting pixels, the pixels having a pixel with a light-shielding mask whose left half opens in a semicircular shape and a microlens formed on a front surface of a light-receiving surface and a pixel with a light-shielding mask whose left half opens in a semicircular shape and a microlens formed on a front surface of a light-receiving surface.

Figure 11:
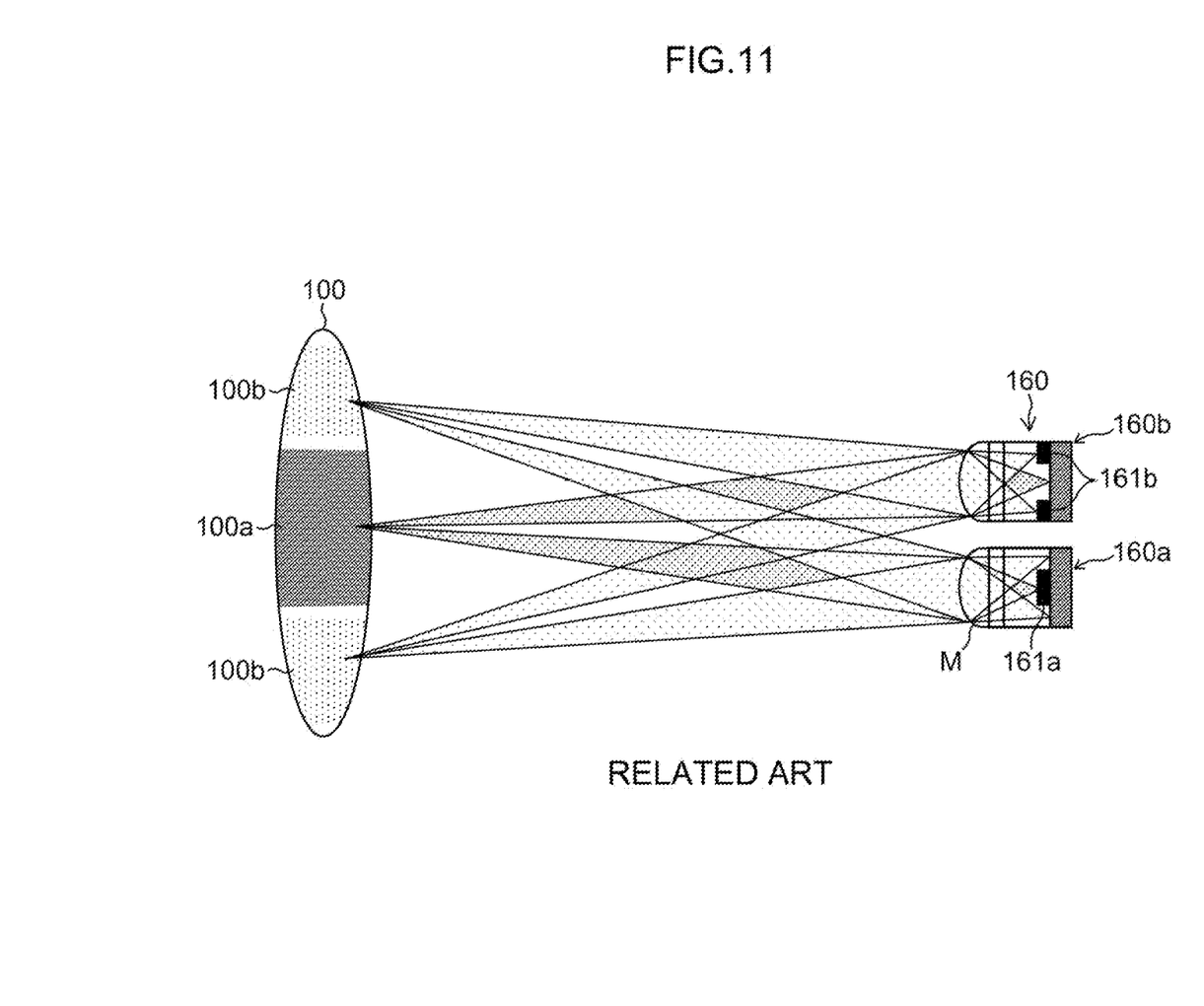
FIG. 11 is a diagram schematically depicting an example of a conventionally taking lens, light-shielding member, and image pickup device.

As depicted in FIG. 11, an image of a light beam passing through an imaging lens 100 is formed by a microlens M on the light-receiving surface of each cell of an image pickup device 160. Since a light-shielding member 161a formed on the light-receiving surface of a light-receiving cell 160a of the image pickup device 160 shields a light beam passing through a center region 100a of the imaging lens 100, only an image of a light beam passing through a peripheral region 100b of the imaging lens 100 is formed on the light-receiving cell 160a. Also, since a light-shielding member 161b formed on the light-receiving surface of a light-receiving cell 160b of the image pickup device 160 shields a light beam passing through the peripheral region 100b of the imaging lens 100, only an image of a light beam passing through the center region 100a of the imaging lens 100 is formed on the light-receiving cell 160b.

Forming different images by pupil division is used not only for focus detection but also in a monocular stereoscopic imaging apparatus. In the monocular stereoscopic imaging apparatus, light passing though the imaging lens is subjected to pupil division, and images of a subject image passing through different regions of the imaging lens are formed at respective image pickup devices, thereby simultaneously obtaining a plurality of images.

SUMMARY OF THE INVENTION

However, in the invention described in Japanese Patent Application Laid-Open No. 2010-210903 and the monocular stereoscopic imaging apparatus, light-shielding masks of types corresponding to the number of pupil division are required. Also, since light-shielding masks are provided to all pixels, many light-shielding masks are required, and many masks of different types have to be accurately manufactured and arranged. In this structure, however, if the structure of the image pickup device becomes finer, processing and manufacturing with high accuracy correspondingly becomes difficult. Moreover, there is a problem in which it is difficult to change the design of the shape and position of the light-shielding unit and fulfill demands for supplying a product with light-shielding units of various positions and shapes.

The present invention has been made in view of these circumstances, and has an object of providing an imaging apparatus capable of pupil division with a simple structure and easy support for various products.

To achieve the object above, an imaging apparatus of the present invention includes a taking lens having a first region with a first characteristic and a second region with a second characteristic different from the first characteristic; an image pickup device having a first light-receiving element and a second light-receiving element two-dimensionally arranged; a light-shielding member which shields a light beam passing through the taking lens; and an image generating unit which generates an image of a subject from an imaging signal of the first light-receiving element or the second light-receiving element, wherein the light-shielding member is provided only to the first light-receiving element, and performs light shielding so that a light beam passing through the second region does not enter the first light-receiving element.

According to the present invention, the light-shielding member performing light shielding so that the light beam passing through the second region does not enter the first light-receiving element is provided only to the first light-receiving element. That is, no light-shielding member is provided to the second light-receiving element. Therefore, the number and types of light-shielding members can be reduced, and pupil division can be performed with a simple structure. Also, various products can be easily supported.

Also, according to the present invention, the light-shielding member is provided to the first light-receiving element, thereby preventing the light beam passing through the second region from entering the first light-receiving element. Thus, when an image is generated from the imaging signal of the first light-receiving element, image processing of removing an influence of the light beam passing through the second region is not necessary.

In the present invention, the ratio of the second region occupying the entire exit pupil of the taking lens may be defined so that a characteristic of the image of the subject when an entire region of the exit pupil has the second characteristic is identical to a characteristic of an image of the subject generated from the light beam passing through the second region. With this structure adopted, when an image is generated from the imaging signal of the second light-receiving element, image processing of removing an influence of the light beam passing through the first region is not necessary.

Here, the sentence that the characteristics of two images are "identical" to each other not only means that the characteristics are completely identical to each other but also includes the case in which the characteristics of two images may be different to such an extent that the difference cannot be immediately identified by the user when viewing the images. To make such a difference between the images, the ratio of the second region occupying an entire exit pupil of the taking lens is preferably set larger than 75% (for example, 75.1%), and is more preferably set at 80% or higher.

In the present invention, the imaging apparatus may further include an image processing selecting device which accepts selection as to whether to perform image processing of removing an influence of the light beam passing through the second region when an image of the subject is generated from the imaging signal of the first light-receiving element and selection as to whether to perform image processing of removing an influence of the light beam passing through the first region when an image of the subject is generated from the imaging signal of the second light-receiving element, wherein the image generating unit may perform image processing according to the selection accepted by the image processing selecting device. By performing the image processing described above, the image of the subject can be improved in image quality as required.

The light-shielding member can be arranged between the taking lens and the image pickup device. In this case, the light-shielding member may be an optically transparent plate-shape member having a light-shielding part formed on a surface. As this light-shielding member, for example, a transparent glass plate with a light-shielding object formed on the surface by etching can be used, and a small light-shielding object can be accurately formed on the light-shielding member.

The light-shielding member may be fixed at a position a predetermined distance away from the image pickup device. With this, the light-shielding object can shield all light beams passing through a predetermined region of the taking lens.

The light-shielding member may be movably disposed in an optical axis direction of the taking lens. Also, the light-shielding member may be arranged so as to be able to move in parallel along a plane orthogonal to an optical axis direction of the taking lens. With this, the effect of the light-shielding member can be eliminated without removing the light-shielding member. Thus, the light-shielding member can be switched between ON/OFF with a simple structure.

The light-shielding member may be a light-shielding mask provided on a light-receiving surface of the first light-receiving element. Even with this structure, the effect of the present invention can be obtained.

The first and second light-receiving elements may be arranged so that a ratio of the first light-receiving elements occupying all light-receiving elements is equal to a ratio of the first region occupying an entire region of an exit pupil of the taking lens. With this, a degradation in quality of the image generated from the imaging signal of the second light-receiving element can be suppressed. Note that in the present invention, the ratio of the first and second light-receiving elements is not restricted to the case of complete equality, but a slight difference (two light-receiving elements are approximately equal in ratio) will do depending the purpose of the image to be obtained and the characteristic of the optical member.

When generating an image of the subject from the output signal of the second light-receiving element, the image generating unit may perform processing of interpolating a pixel dropout of the second light-receiving element at a position where the first light-receiving element is disposed. With this, the image quality of the image obtained from the light beam passing through the second region can be improved.

The taking lens may be formed of a region with a circular plane shape arranged centering on an optical axis and an annular region arranged on an outer edge of the circular region, the annular region may be the first region, and the circular region may be the second region. With this, the image quality of the image obtained from the light beam passing through the first region can be improved.

The first region may have a first focal length as the first characteristic, and the second region may have a focal length longer than the first focal length as the second characteristic. With this, images with different distances of the subject, such as a far distance image and a near distance image, can be obtained.

The imaging apparatus may further include a generated image selecting device which accepts selection as to from which of the imaging signal of either of the first light-receiving element and the second light-receiving element an image is to be generated. With this structure, an image required by a photographer can be provided.

According to the present invention, an imaging apparatus capable of pupil division with a simple structure and easy support for various products can be provided.

DETAILED DESCRIPTION OF THE EMBODIMENTS

Embodiments of the imaging apparatus according to the present invention are described below according to the attached drawings.

First Embodiment

Figure 1:
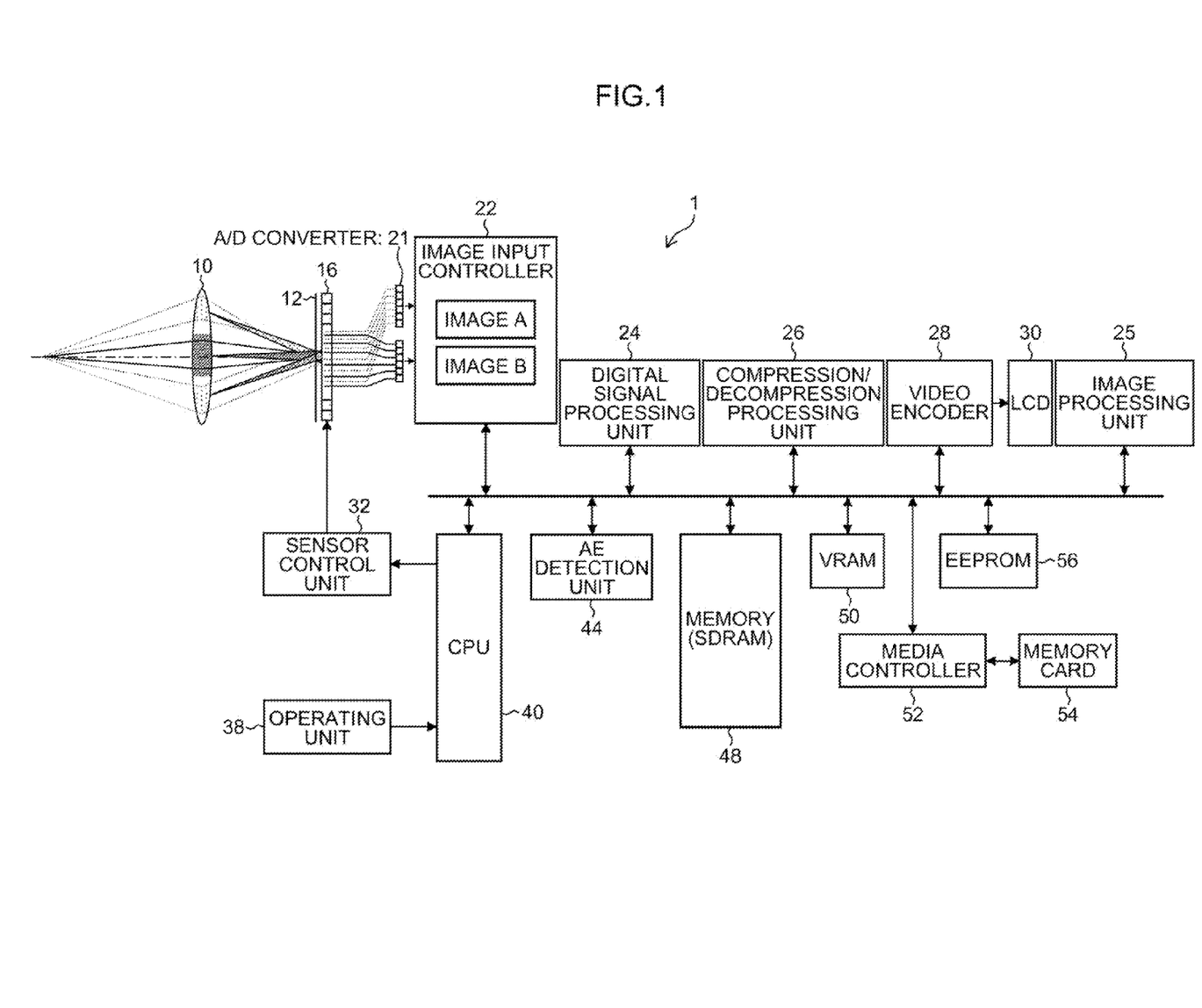
FIG. 1 is a block diagram of the structure of an imaging apparatus 1 according to a first embodiment of the present invention.

FIG. 1 is a block diagram of the structure of an imaging apparatus 1 according to a first embodiment of the present invention. The imaging apparatus 1 records an imaged image in a memory card 54. The entire operation of the apparatus is controlled in a centralized manner by a Central Processing Unit (CPU) 40.

The imaging apparatus 1 is provided with an operating unit 38 including a shutter button, a mode dial, a reproduction button, a MENU/OK key, a cross key, and a BACK key. A signal from this operating unit 38 is inputted to the CPU 40, and the CPU 40 controls each circuit of the imaging apparatus 1 based on the input signal. For example, the CPU 40 performs lens drive control, diaphragm drive control, photographing operation control, image processing control, image data recording/reproduction control, display control over a liquid-crystal monitor (LCD) 30, and others.

The shutter button is an operation button for inputting an instruction for starting photographing, and is configured of a switch of a two-step stroke type having an S1 switch that is turned ON at the time of a half push and an S2 switch that is turned ON at the time of a full push. The mode dial is an operating member for selecting operation of selecting any of an auto photographing mode for photographing a still picture, a manual photographing mode, a scene position such as people, landscape, and nightscape, and a moving-picture mode for photographing moving picture.

The reproduction button is a button for switching to a reproduction mode for displaying the photographed and recorded still picture or moving picture on the liquid-crystal monitor 30. The MENU/OK key is an operation key having both of a function as a menu button for making an instruction for causing a menu on the screen of the liquid-crystal monitor 30 and a function as an OK button for making an instruction for determining and executing a selected content. The cross key is an operating unit for inputting an instruction in four directions, that is, upward, downward, leftward, and rightward, and function as a button (a cursor movement operation device) for selecting an item from the menu screen and making an instruction for selecting various setting items from each menu. Also, an up/down key of the cross key functions as a zoom switch at the time of photographing or a reproduction zoom switch in the reproduction mode. A left/right key functions as a frame advance (forward/backward advance) button in the reproduction mode. The BACK key is used when, for example, a desired target such as a selection item is deleted, an instruction content is cancelled, or the operation state is returned to an immediately previous state.

In a photographing mode, an image of subject light is formed on the light-receiving surface of an image pickup device 16 of a CMOS type via a taking lens 10, a diaphragm (not depicted in the drawing), and a light-shielding member 12.

The diaphragm includes, for example, five diaphragm blades. The CPU 40 performs five-step diaphragm control in 1 AV steps from diaphragm values of F2.8 to F11.

Figure 4:
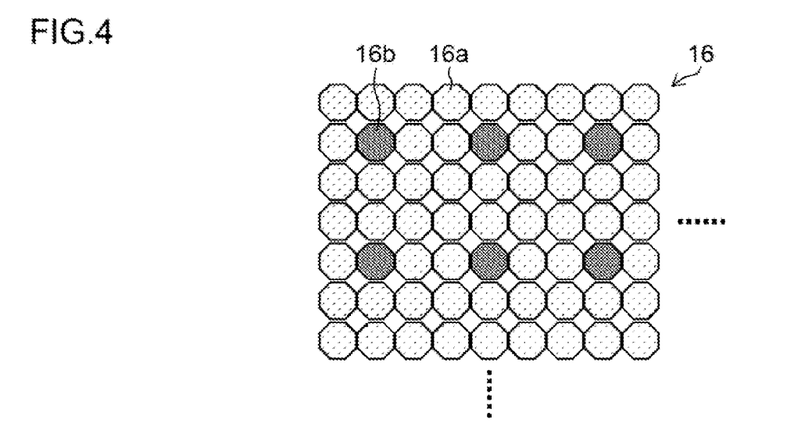
FIG. 4 is a diagram of the arrangement of photo sensors of the image pickup device.

The image pickup device 16 has many photo sensors (light-receiving elements) two-dimensionally arranged (refer to FIG. 4). A subject image formed on the light-receiving surface of each photo sensor is converted to signal voltage (or electrical charge) of an amount according to the incident light amount.

On front side of the image pickup device 16, that is, between the taking lens 10 and the image pickup device 16, a light-shielding member 12 is disposed in parallel with the light-receiving surface of the image pickup device 16, that is, in parallel with a surface orthogonal to the optical axis.

Figure 2:
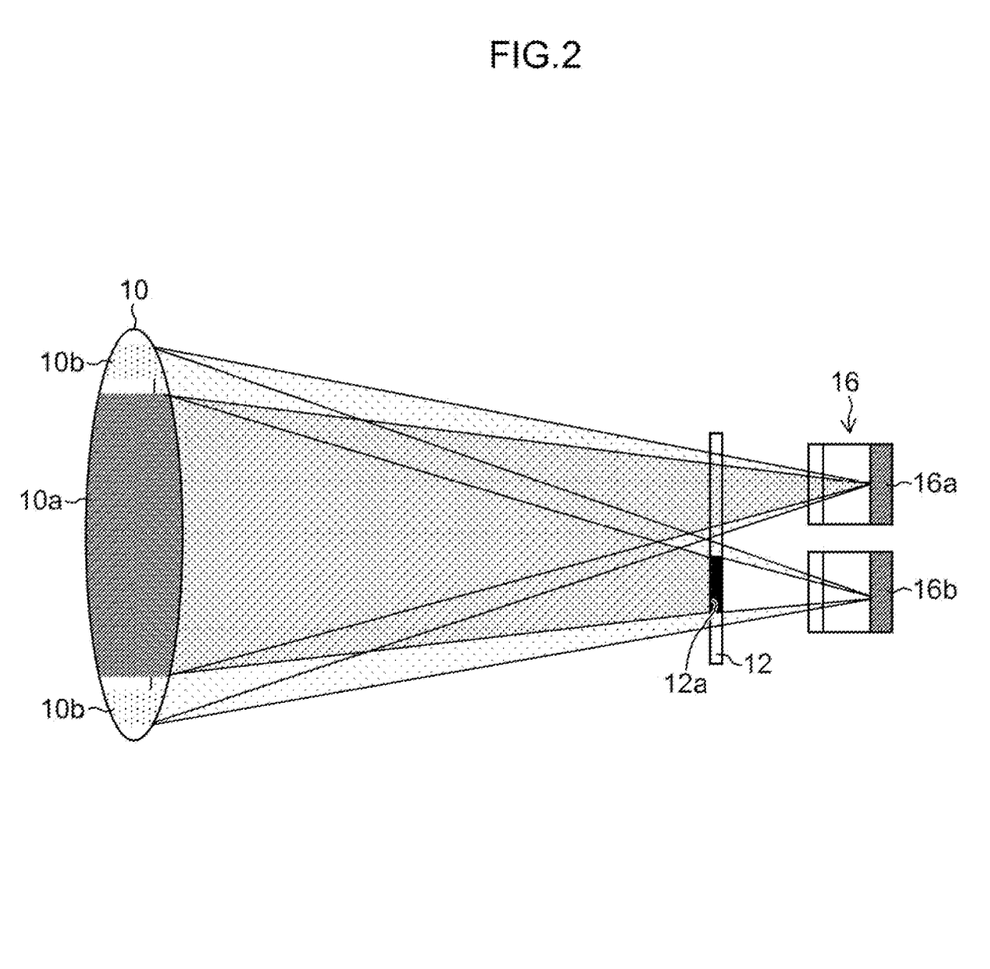
FIG. 2 is a diagram schematically depicting a taking lens, a light-shielding member, and an image pickup device of the imaging apparatus 1.

FIG. 2 is a diagram schematically depicting the taking lens 10, the light-shielding member 12, and the image pickup device 16 in the present embodiment. Note that while the taking lens 10 is configured of a plurality of lenses, FIG. 2 schematically depicts one lens. Also in FIG. 2, two photo sensors are depicted as the image pickup device 16, and the light-shielding member 12 is also depicted with the size corresponding to these two photo sensors. However, these optical elements are not restricted to these, and it goes without saying that the present embodiment has any number of optical elements with any size capable of photographing a subject.

Figure 3:
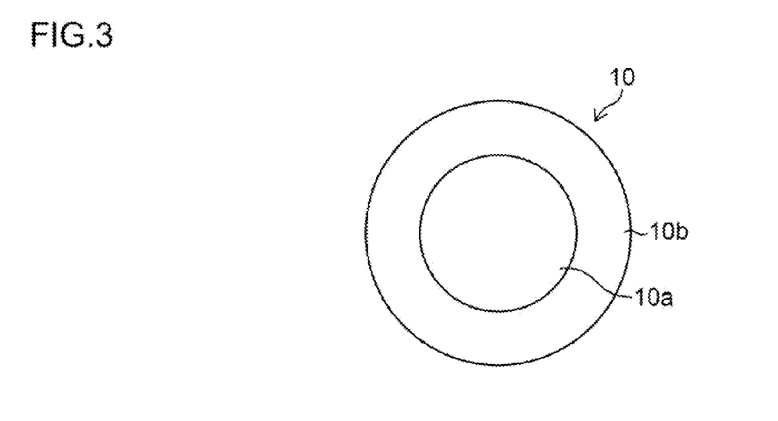
FIG. 3 is a diagram of a flat shape of the taking lens.

The taking lens 10 is a bifocal lens having a region (hereinafter referred to as a near focal region) where convergence is made with a short focal length and macro photographing is possible and a region (hereinafter referred to as a far focal region) where convergence is made with a focal length longer than that of the near focal region and landscape and the like can be photographed. The taking lens 10 is divided into a region with a shape when viewed from front (hereinafter referred to as a planar shape) being circular and an outside annular region, as depicted in FIG. 3. The circular region at the center is a far focal region 10a, and the annular region is a near focal region 10b. Regarding these regions, the ratio of the near focal region 10b occupying the entire region of the exit pupil of the taking lens 10 is 20%, and the ratio of the far focal region 10a occupying the entire region thereof is 80%.

Light beams passing through the far focal region 10a and the near focal region 10b enter each photo sensor of the image pickup device 16. The image pickup device 16 has a far-image light-receiving cell 16a which light beams passing though the far focal region 10a and the near focal region 10b, that is, light beams passing through the entire exit pupil of the image pickup device 16, enter, and a near-image light-receiving cell 16b which only light beams passing through the near focal region 10b enter. In the present embodiment, the near-image light-receiving cells 16b are arranged at a ratio of one to nine pixels (3×3), as depicted in FIG. 4. This is the result of arranging the near-image light-receiving cells 16b so that the ratio of the near-image light-receiving cells 16b occupying all photo sensors (a total of the far-image light-receiving cells 16a and the near-image light-receiving cells 16b) of the image pickup device 16 is a ratio of the near-focal region 10b occupying an entire region (a total of the far focal region 10a and the near focal region 10b) of the exit pupil of the taking lens 10. In the present embodiment, an image obtained from the far-image light-receiving cells 16a is a main image, and an image obtained from the near-image light-receiving cells 16b is a sub-image. By increasing the far-image light-receiving cells 16a according to the area ratio of the taking lens, a degradation in image quality of the main image can be prevented.

Note that the ratio of the near-image light-receiving cells 16b may be set so that the ratio of the near-image light-receiving cells 16b occupying all photo sensors of the image pickup device 16 is equal to the ratio of the near focal region 10b occupying the entire region of the exit pupil of the image pickup device 16.

As the light-shielding member 12, a transparent glass plate having a thickness on the order of 10 μm to 100 μm is used. As the light-shielding member 12, a cover glass of the image pickup device 16 can be used. The light-shielding member 12 is not limited to a glass, and a transparent film extended over a plate-shaped frame can be used.

Figure 5:
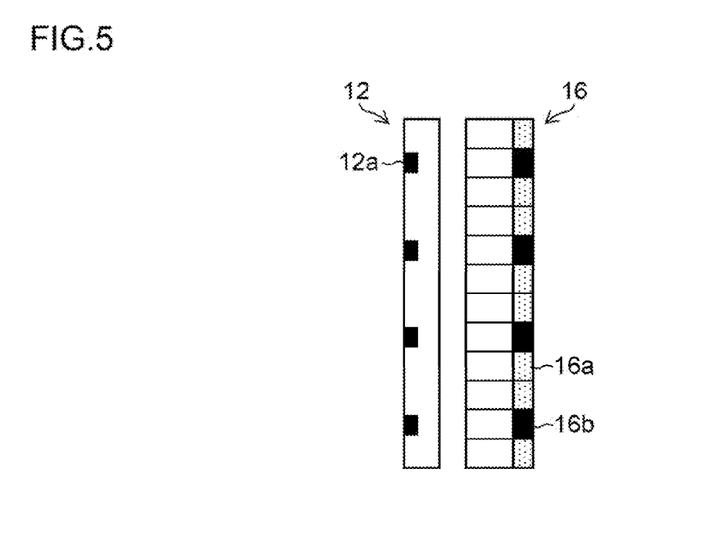
FIG. 5 is a diagram schematically depicting a light-shielding member and the image pickup device.

As depicted in FIG. 5, the light-shielding objects 12a are provided to the light-shielding member 12 so as to correspond to the near-image light-receiving cells 16b, that is, so as to be positioned at front surfaces of the near-image light-receiving cells 16b. The light-shielding objects 12a is a black region formed by etching or the like on the surface of the light-shielding member 12, and has a diameter on the order of 5 μm. This 5 μm is a value determined so as to be substantially equal to the diameter of each photo sensor of the image pickup device 16. In the present embodiment, since the near-image light-receiving cells 16b are arranged at the ratio of 1 pixel to 9 pixels (3×3), the space between the light-shielding object 12 and the light-shielding object 12 is 15 μm. By generating the light-shielding objects 12a by etching, the small light-shielding objects 12a on the order of 5 µm can be accurately formed at fine spacing.

Since the light-shielding objects 12a are provided so as to correspond to the near-image light-receiving cells 16b, as depicted in FIG. 2, with the principle of silhouettes, the light-shielding objects 12a shield light beams passing through the far focal region 10a, and only light beams passing through the near focal region 10b enter the near-image light-receiving cells 16b. With this structure, only a light beam passing through a desire region of the taking lens system can be received by the photo sensors without using a microlens.

Also in the present embodiment, the light-shielding object 12a is provided which performs light shielding so that a light beam passing through the far focal region 10a does not enter the near-image light-receiving cell 16b. Since the far-image light-receiving cell 16a is not provided with a light-shielding member, the number and types of light-shielding members can be reduced, and pupil division can be performed with a simple structure. Also, various products can be easily supported.

Figure 6:
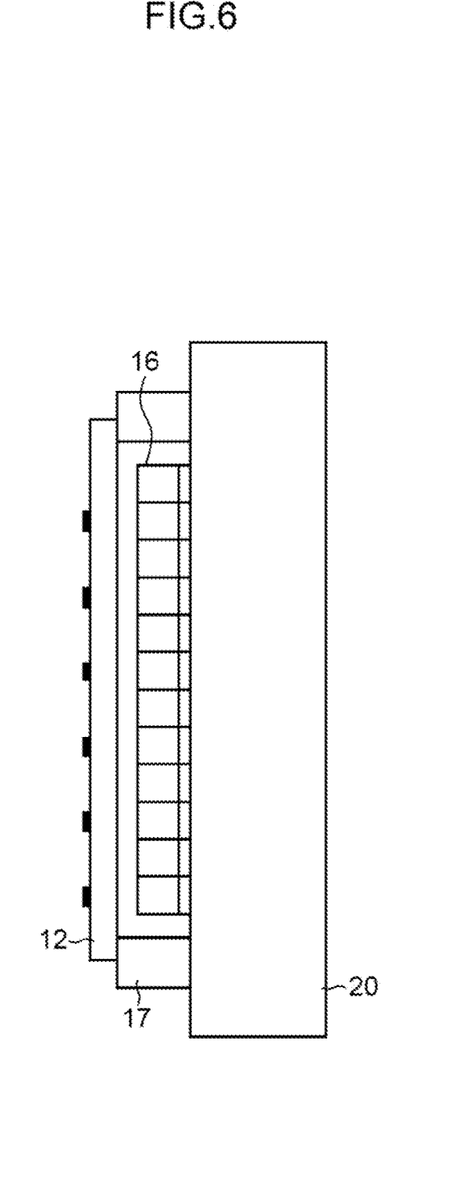
FIG. 6 is a diagram depicting how to mount the light-shielding member.

For the light-shielding object 12a to shield all light beams passing through the far focal region 10a, the distance between the image pickup device 16 and the light-shielding member 12 (the light-shielding object 12a) in the optical axis direction is important. As depicted in FIG. 6, a flange 17 is disposed so as to surround the image pickup device 16, and the light-shielding member 12 is disposed so as to abut on an end face of the flange 17. The image pickup device 16 and the flange 17 each have a back surface fixed to the same surface of a camera body 20. Therefore, with the light-shielding member 12 abutting on the end face of the flange 17, the light-shielding member 12 can be accurately positioned. Thus, by setting an appropriate value as the height of the flange 17, the distance between the image pickup device 16 and the light-shielding member 12 in the optical axis direction can be kept at an appropriate distance. The space between the image pickup device 16 and the light-shielding member 12 may be filled with air or an optical medium (such as liquid or adhesive).

Note that although twelve photo sensors are depicted as the image pickup device 16 and four light-shielding objects 12a are depicted as the light-shielding member 12 in FIG. 5, these optical elements are not restricted to the above. Also in FIG. 6, the number of photo sensors of the image pickup device 16 and the number of the light-shielding objects 12a of the light-shielding member 12 are not restricted to the above.

Signal voltage (or electrical charge) accumulated in the image pickup device 16 is accumulated in the photo sensors themselves or a capacitor annexed thereto. The accumulate signal voltage (or electrical charge) is read by the sensor control unit 32 by using a methodology of a MOS-type image pickup device (so-called CMOS sensor) using an X-Y address scheme, together with selection of a pixel position.

The voltage signal read from the image pickup device 16 is subjected to correlated double sampling (for the purpose of reducing noise (in particular, thermal noise) and the like included in the output signal from the image pickup device, processing of obtaining more accurate pixel data by taking a difference between a feed-through-component level included in the output signal for each pixel of the image pickup device and a pixel signal component level). With this, R (red), G (green) and B (blue) signals for each pixel are sampled and held, amplified, and then added to an A/D converter 21. The A/D converter 21 converts sequentially inputted R, G, and B signals to digital R, G, and B signals for output to an image input controller 22.

A digital signal processing unit 24 performs predetermined signal processing on the digital image signal inputted via the image input controller 22, the signal processing such as offset processing, gain control processing including white balance correction and sensitivity correction, gamma correction processing, YC processing.

The image data processed in the digital signal processing unit 24 is inputted to a VRAM 50. The image data read from the VRAM 50 is encoded by a video encoder 28, and is outputted to a liquid-crystal monitor 30 provided to a back surface of a camera. With this, a subject image is displayed on a display screen of the liquid-crystal monitor 30.

When a push at a first stage (a half push) of the shutter button of the operating unit 38 is provided, the CPU 40 starts an AE operation, and the image data outputted from the A/D converter 21 at the time of the half push of the shutter button is captured by an AE detection unit 44.

The AE detection unit 44 accumulates G signals on the entire screen or G signals weighted differently between a screen center portion and a peripheral portion, and outputs the accumulated value to the CPU 40. The CPU 40 calculates a brightness (a photographing Ev value) of the subject from the accumulated value inputted from the AE detection unit 44. Based on the photographing Ev value, the CPU 40 determines a diaphragm value of the diaphragm and an electronic shutter (a shutter speed) of the image pickup device 16 by following a predetermined program diagram. The CPU 40 then controls the diaphragm via a diaphragm driving unit (not depicted in the drawing) based on the determined diaphragm value, and controls a charge accumulation time at the image pickup device 16 via the sensor control unit 32 based on the determined shutter speed.

When the AE operation ends and a push at a second stage (a full push) of the shutter button is provided, image data outputted from the A/D converter 21 in response to the push is inputted from the image input controller 22 to a memory (SDRAM) 48 for temporary storage. In the present embodiment, either one of the image data read from the far-image light-receiving cells 16a, the image data read from the near-image light-receiving cells 16b or both of the image data read from the far-image light-receiving cells 16a and the image data read from the near-image light-receiving cells 16b can be obtained upon instruction from a photographer via the operating unit 38 or automatically by the CPU 40.

The image data temporarily stored in the memory 48 is read by the digital signal processing unit 24 as appropriate, wherein predetermined signal processing including processing of generating luminance data and color-difference data of the image data (YC processing) is performed. The image data subjected to YC processing (YC data) is again stored in the memory 48.

Subsequently, the YC data is read from the memory 48 to an image processing unit 25. From the image data read from the far-image light-receiving cells 16a, a far image (a far-distance image) is generated. From the image data read from the near-image light-receiving cells 16b, a near image such as a micro image (a near-distance image) is generated. In the following, processing performed by the image processing unit 25 at the time of generation of these images is described.

In the present embodiment, the far focal region 10a occupies 80% of the entire region of the exit pupil of the taking lens 10. Therefore, the characteristic of the image of the subject when the entire region of the exit pupil is a far focal region and the characteristic of a far focal image generated from the light beams passing through the far focal region 10a are substantially identical to each other. At the time of generating a far focal image, processing of removing an influence of the light beam passing through the near focal region 10b is not required. However, since the light beams passing through the near focal region 10b and the light beams passing through the far focal region 10a enter the far-image light-receiving cells 16a, when a far-distance image is generated from imaging signals of the far-image light-receiving cells 16a, image processing of removing an influence of velocity of light passing through the near focal region 10b (for example, blurring correction and contrast correction) may be performed to improve the image quality of the far-distance image as required.

On the other hand, the light-shielding object 12a is provided to the near-image light-receiving cell 16b, preventing a light beam passing through the far focal region 10a from entering the near-image light-receiving cell 16b. Thus, at the time of generating a near focal image from imaging signals of the near-image light-receiving cells 16b, processing of removing an influence of the light beams passing through the far focal region 10a is not required. However, since it can be thought that the light beams passing through the far focal region 10a slightly enter the near-image light-receiving cells 16b depending on process and arrangement accuracy of the light-shielding member 12 (and the light-shielding object 12a) or the like. Such incident light may serve as an error component and possibly cause a degradation in image quality, such as blurring degradation and contrast degradation. Thus, when a near-distance image is generated from imaging signals of the near-image light-receiving cells 16b, image processing of removing an influence of the light beam passing through the far focal region 10a may be performed to improve the image quality of the near-distance image as required.

Selection whether to perform this processing is accepted upon instruction from a photographer via the operating unit 38, and the image processing unit 25 performs the image processing by following the accepted selection. Note that while image processing at the time of generating a far-distance image is described below, this image processing can be similarly performed at the time of generating a near-distance image.

When subject light entering the far-image light-receiving cells 16a is only light beams passing through the far focal region 10a, the subject image is a point image. However, since light beams passing through the far focal region 10a and the near focal region 10b enter the far-image light-receiving cells 16a, subject light passing through the near focal region 10b serves as a blurring component, resulting in a blurred image (a large point image). Therefore, blurring correction processing is performed on the image data read from the far-image light-receiving cells 16a to correct blurring due to mixture of components of a macro image passing through the near focal region 10b. As blurring correction processing, any of various known methods can be applied, for example, filtering processing by a recovery filter.

Also, when subject light entering the far-image light-receiving cells 16a is only light beams passing through the far focal region 10a, the contrast of the subject image becomes clear. Since light beams passing through the far focal region 10a and the near focal region 10b enter the far-image light-receiving cells 16a, subject light passing through the near focal region 10b makes a difference between light and dark inconspicuous, which causes a decrease in contrast. Therefore, contrast correction processing is performed on the image data read from the far-image light-receiving cells 16a to correct degradation in contrast due to mixture of components of a macro image passing through the near focal region 10b. As contrast correction processing, any of various known methods including processing of highlighting a difference between a bright portion and a dark portion is performed. For example, upon obtaining information about the difference between light and dark by converting an RGB signal to a YCrCb signal, the value of this Y signal is enlarged at a predetermined ratio, thereby enlarging Y signal distribution, that is, a difference in brightness. Also, as a method of correcting degradation in contrast, contour highlighting processing (for example, Japanese Patent Application Laid-Open No. 2011-124712) may be used.

Also, since the near-image light-receiving cell 16a is included at a ratio of one pixel to nine pixels (3×3) (refer to FIG. 4), data of a pixel where the near-image light-receiving cells 16a is present is lost from the far-distance image generated from the image data read from the far-image light-receiving cells 16a. Therefore, regarding the lost pixel due to the presence of the near-image light-receiving cell 16a, an interpolating process is performed based on the image data of the peripheral far-image light-receiving cells 16a to perform a process of filling the lost pixel (self-interpolating process). Since the interpolating process is known, its description is omitted. Note that the number of rows for interpolation and weighting mode can be selected as appropriate.

Furthermore, the size of the near focal region 10b is small compared with the size of the far focal region 10a, and the number of near-image light-receiving cells 16b is small, at the ratio of one pixel to nine pixels (3×3), which makes the image dark. Therefore, processing of brightening the brightness of the image data read from the near-image light-receiving cells 16a may be performed. However, this processing is not indispensable.

The far-distance image and macro image (near-distance image) obtained as described above are each outputted to a compression/decompression processing unit 26, where a predetermined compression process such as JPEG (Joint Photographic Experts Group) is performed, and then these images are stored again in the memory 48.

A multipicture file (an MP file: a file of a format where a plurality of images are coupled together) is generated from the YC data (compressed data) stored in the memory 48, and the MP file is read by a media controller 52 and is recorded on the memory card 54.

According to the present embodiment, with a simple structure in which a light-shielding member is provided on the front surface of the image pickup device, only a light beam passing through a predetermined region of the taking lens can be let enter a photo sensor. That is, a desired directivity characteristic can be obtained for the image pickup device. Also, since it is not necessary to use a microlens, manufacturing cost can be decreased. Also, when the cover glass of the image pickup device 16 is used as the light-shielding member 12, a directivity characteristic can be provided to the image pickup device without increasing the number of members.

Also, according to the present embodiment, since the light-shielding member and the image pickup device are separate members, the light-shielding member can be easily removed. Therefore, even if a desired directivity characteristic cannot be obtained, correction of the mount position of the light-shielding member is easy, and manufacturing cost can be decreased. Moreover, low-volume high-variety production and design change can be supported without increasing cost.

Furthermore, according to the present embodiment, since the light-shielding member is outside the image pickup device, noise due to diffraction of light at an end face of the light-shielding member or the like can be eliminated to improve the image quality.

Note that while no microlens is provided in the present embodiment, a microlens may be provided if there is a problem in space, for example. In this case, the light-shielding member is provided on the front surface of the microlens so that only the light passing through the light-shielding member enters the microlens.

Figure 7:
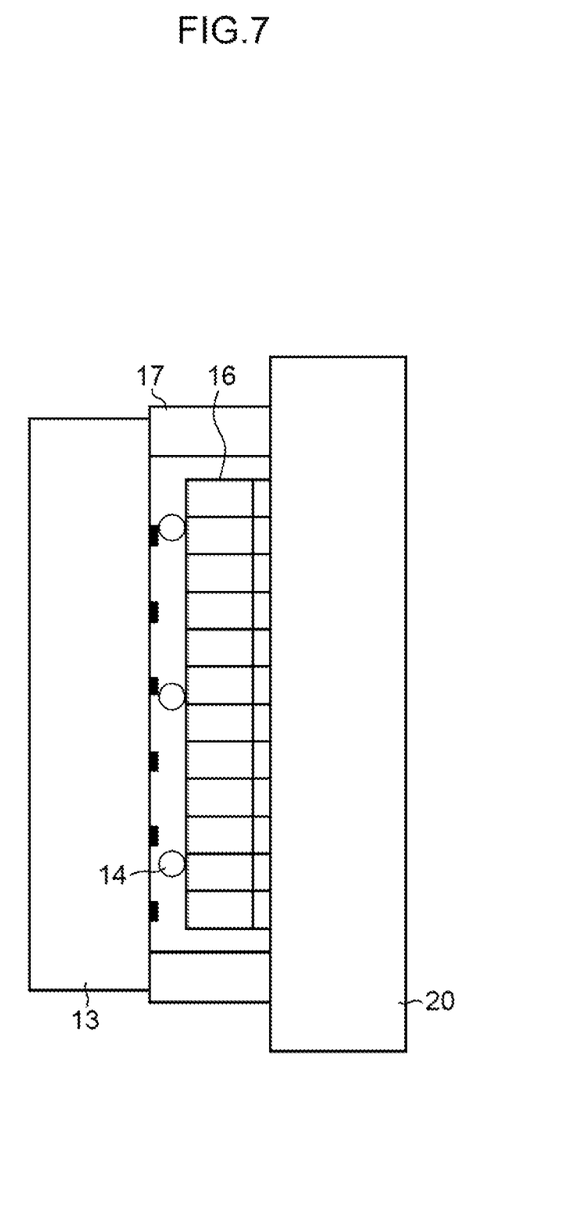
FIG. 7 is a diagram depicting a modification example of how to mount the light-shielding member.

Still further, according to the present embodiment, the image pickup device 16 and the flange 17 are fixed to the camera body 20, and the light-shielding member 12 abuts on the end face of the flange 17, thereby positioning the light-shielding member 12. However, the method of positioning the light-shielding member is not restricted to this. FIG. 7 is a diagram depicting a different method of positioning the light-shielding member 12.

A light-shielding member 13 is a glass plate, and a light-shielding object is formed on the surface by etching or the like. To determine a distance between the image pickup device 16 and the light-shielding member 12, the light-shielding member 13 is provided so that the light-shielding object faces the image pickup device 16 and a transparent spacer 14 is interposed between the light-shielding member 13 and the image pickup device 16. The size of the spacer is several μm, and a member such as a bead for use to keep a gap between liquid-crystal glasses can be used.

First Modification Example

In the first embodiment of the present invention, the light-shielding member is fixed so as to abut on the end face of the flange, thereby accurately positioning the position of the light-shielding member in the optical axis direction. However, the method of mounting the light-shielding member is not restricted to this. Modification examples of the method of mounting the light-shielding member is described below.

A first modification example represents a mode in which the light-shielding member is movably disposed in the optical axis direction. In the first modification example, the light-shielding member 12 is movably disposed in a moving direction, and is moved by a light-shielding member drive unit in the optical axis direction. As the light-shielding member drive unit, any of various actuators can be used. For example, a plurality of stick-like members are movably provided on the camera body 20 where the back surface of the image pickup device 16 is fixed, a force is exerted on the light-shielding member 12 in a direction of abutting on the tips of the stick-like members, and the stick-like members are moved by the light-shielding member drive unit in the optical axis direction. With this structure, the position of the light-shielding member 12 in the optical axis direction can be changed. Note that the stick-like members are disposed on a front side of the light-receiving surface of the image pickup device 16 (a side closer to the taking lens 10; a left direction in FIG. 8A and FIG. 8B) even if the stick-like members are most retreated (a side far away from the taking lens 10; a right direction in FIG. 8A and FIG. 8B). However, the structure in which the light-shielding member 12 is movably disposed in the optical axis direction is not restricted to this.

Figure 8A:
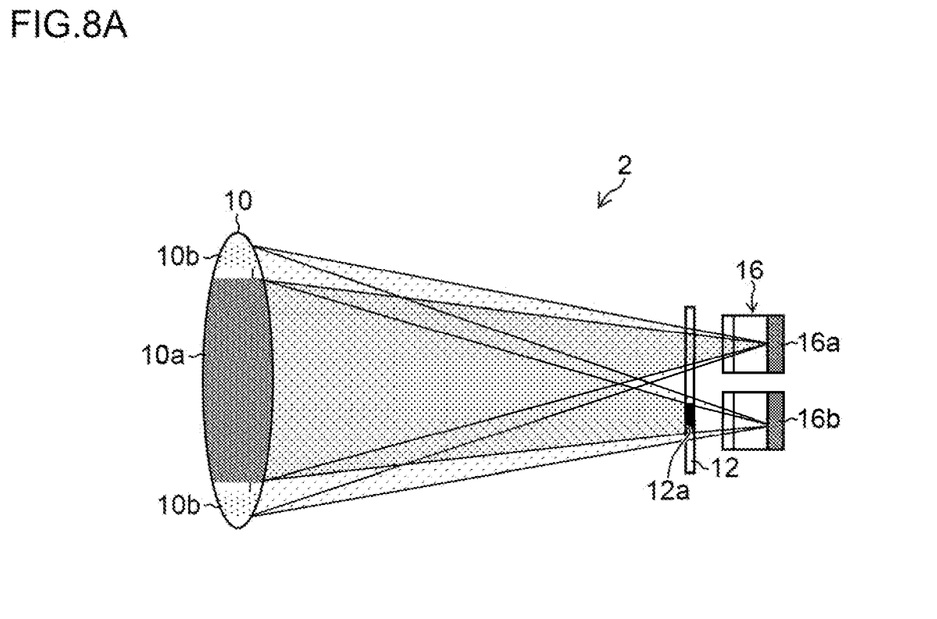
FIG. 8A is a diagram of an example of movement of the light-shielding member, depicting the case in which the light-shielding member is positioned closest to the image pickup device.
Figure 8B:
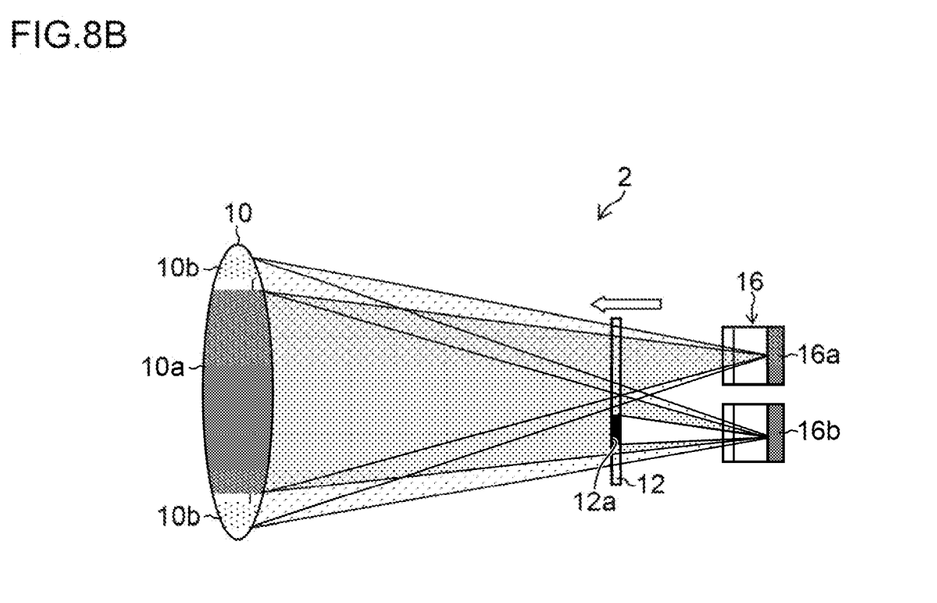
FIG. 8B is a diagram of an example of movement of the light-shielding member, depicting the case in which the light-shielding member is moved to a position farthest to the image pickup device.

FIG. 8A and FIG. 8B are diagrams schematically depicting the taking lens 10, the light-shielding member 12, and the image pickup device 16 in the present embodiment. While the taking lens 10 is formed of a plurality of lenses, FIG. 8A and FIG. 8B schematically depict one lens. Also, while two photo sensors are depicted as the image pickup device 16 and the light-shielding member 12 is also depicted in size corresponding to these two photo sensors in FIG. 8A and FIG. 8B, these optical elements are not restricted to these. It goes without saying that any number of size of optical elements capable of photographing a subject can be provided.

FIG. 8A depicts the case when the light-shielding member 12 is positioned closest to the image pickup device 16. This is a situation similar to the first embodiment (the situation depicted in FIG. 2) in geometric positional relation among the taking lens 10, the light-shielding member 12, and the image pickup device 16. In this case, the distance between the image pickup device 16 and the light-shielding object 12a in the optical axis direction is appropriate. Therefore, as with the first embodiment, light beams passing through the far focal region 10a and the near focal region 10b enter the far-image light-receiving cell 16a, and only the light beams passing through the near focal region 10b enter the near-image light-receiving cell 16b.

By contrast, FIG. 8B depicts the case when the light-shielding member 12 is moved to a position farthest to the image pickup device 16. In this case, the distance between the image pickup device 16 and the light-shielding object 12a in the optical axis direction is not appropriate, and only part of the light beams passing through the far focal region 10a is shielded by the light-shielding object 12a. Therefore, part of the light beams passing through the far focal region 10a enters the near-image light-receiving cells 16b. Therefore, the light beams passing through the far focal region 10a and the near focal region 10b enter the near-image light-receiving cell 16b. As such, by changing the distance between the light-shielding member 12 and the image pickup device 16, the effect of the light-shielding member 12 can be eliminated.

Note that the light amount of subject light passing through the far focal region 10a is decreased by an amount of light shielding by the light-shielding object 12a. However, the ratio of the near-image light-receiving cells 16b is one pixel to nine pixels, thereby posing no problem.

According to the first modification example, by moving the light-shielding member in the optical axis direction, the effect of the light-shielding member can be eliminated without removing the light-shielding member. Therefore, it is possible to switch the light-shielding member between ON/OFF with a simple structure. Also, when the effect of the light-shielding member is eliminated, it is not required to perform a self-interpolating process, thereby shortening the time required for image processing.

Second Modification Example

While the light-shielding member is disposed in the optical axis direction in the first modification example described above, the method of mounting the light-shielding member is not restricted thereto.

A second modification example represents a mode in which the light-shielding member is movably disposed in a direction orthogonal to the optical axis direction. In the second modification example, the light-shielding member 12 is disposed so that a wide plane, that is, a plane where the light-shielding object 12a is formed, is orthogonal to the optical axis and the light-shielding member 12 can move in parallel in that surface. A light-shielding member drive unit moves the light-shielding member 12 upward, downward, leftward, and rightward in the plane orthogonal to the optical axis. Here, upward, downward, leftward, and rightward indicate an upward and downward direction (an upward and downward direction in FIG. 9A and FIG. 9B) and a leftward and rightward direction (an orthogonal direction with respect to paper sheet in FIG. 9A and FIG. 9B) when the light-shielding member 12 is viewed from a taking lens 10 side. As the light-shielding member drive unit, any of various actuators can be used. Note that the distance between the light-shielding member 12 and the image pickup device 16 in the optical axis direction is similar to that in the first embodiment (the situation depicted in FIG. 2).

Note that, as the method of disposing the light-shielding member 12 so that the light-shielding member 12 can move in parallel in the plane orthogonal to the optical axis, for example, it is possible to apply a so-called image blurring correction apparatus which detects blurring of the apparatus and moves the image pickup device according to that blurring. Since the image blurring correction apparatus has been already known, its description is omitted.

Figure 9A:
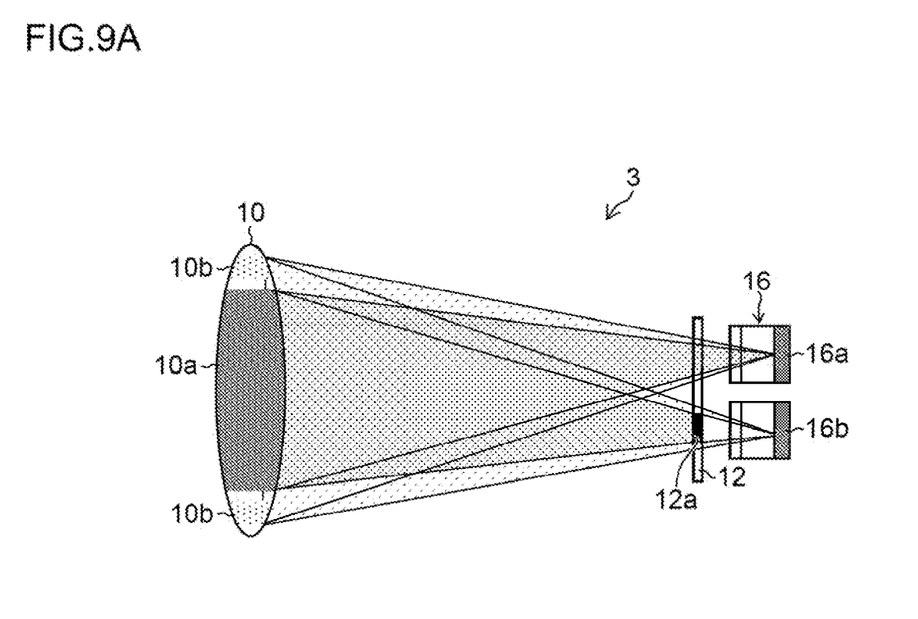
FIG. 9A is a diagram of another example of movement of the light-shielding member, depicting the case in which the light-shielding member is at a basic position.
Figure 9B:
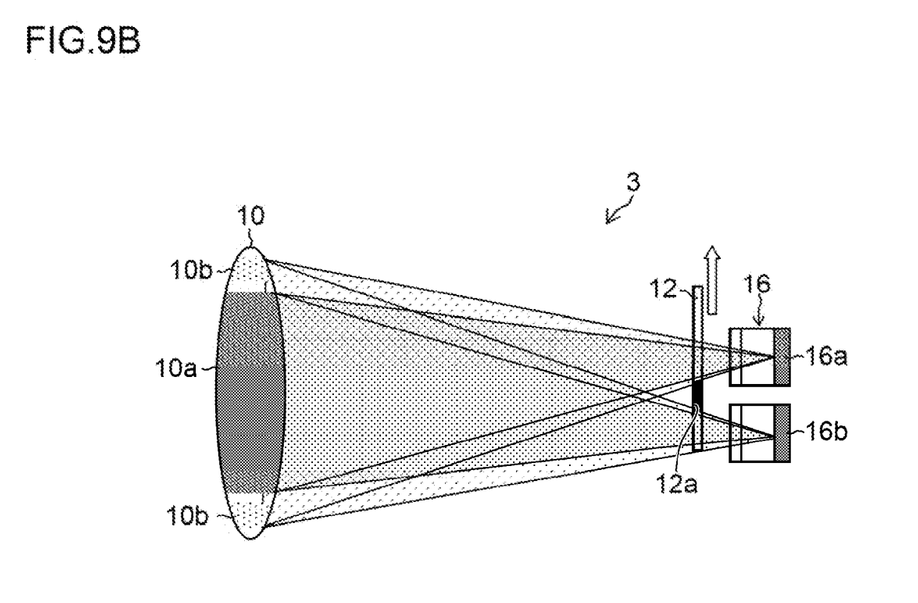
FIG. 9B is a diagram of another example of movement of the light-shielding member, depicting the case in which the light-shielding member is moved from the basic position in an upper direction.

FIG. 9A and FIG. 9B are diagrams schematically depicting the taking lens 10, the light-shielding member 12, and the image pickup device 16 in the present embodiment. While the taking lens 10 is formed of a plurality of lenses, FIG. 9A and FIG. 9B schematically depict one lens. Also, while two photo sensors are depicted as the image pickup device 16 and the light-shielding member 12 is also depicted in size corresponding to these two photo sensors in FIG. 9A and FIG. 9B, these optical elements are not restricted to these. It goes without saying that any number of size of optical elements capable of photographing a subject can be provided.

FIG. 9A depicts the case when the light-shielding member 12 is at a basic position. This is a situation similar to the first embodiment (the situation depicted in FIG. 2) in geometric positional relation among the taking lens 10, the light-shielding member 12, and the image pickup device 16. In this case, the light-shielding object 12a is provided correspondingly to the near-image light-receiving cell 16b, that is, the light-shielding object 12a is positioned on the front surface of the near-image light-receiving cell 16b. Therefore, light beams passing through the far focal region 10a and the near focal region 10b enter the far-image light-receiving cell 16a, and only the light beams passing through the near focal region 10b enter the near-image light-receiving cell 16b.

By contrast, FIG. 9B depicts the case when the light-shielding object 12a is move from the basic position d in an upward direction. The light-shielding object 12a shields part of the light beams passing through the focal region 10b and entering the far-image light-receiving cell 16a. Therefore, light beams passing through the far focal region 10a and the near focal region 10b enter the near-image light-receiving cell 16b. That is, by moving the light-shielding member 12 in a direction orthogonal to the optical axis, the effect of the light-shielding member 12 can be eliminated.

Note that the light amount of subject light passing through the near focal region 10b is decreased by an amount of light shielding by the light-shielding object 12a. Therefore, blurring and contrast degradation due to mixing of components of the macro image are decreased, thereby improving the image quality.

According to the second modification example, by moving the light-shielding member in a direction orthogonal to the optical axis direction, the effect of the light-shielding member can be eliminated without removing the light-shielding member. Therefore, it is possible to switch the light-shielding member between ON/OFF with a simple structure. Also, when the effect of the light-shielding member is eliminated, it is not required to perform a self-interpolating process, thereby shortening the time required for image processing.

Second Embodiment

In the first embodiment and the first and second modification examples described above, the case is described in which the light-shielding member 12 is disposed between the taking lens 10 and the image pickup device 16. However, in the present invention, the arrangement of the light-shielding member 12 is not restricted to these. As described in the second embodiment, the light-shielding member may be disposed on the light-receiving surface of the light-receiving cell.

Figure 10:
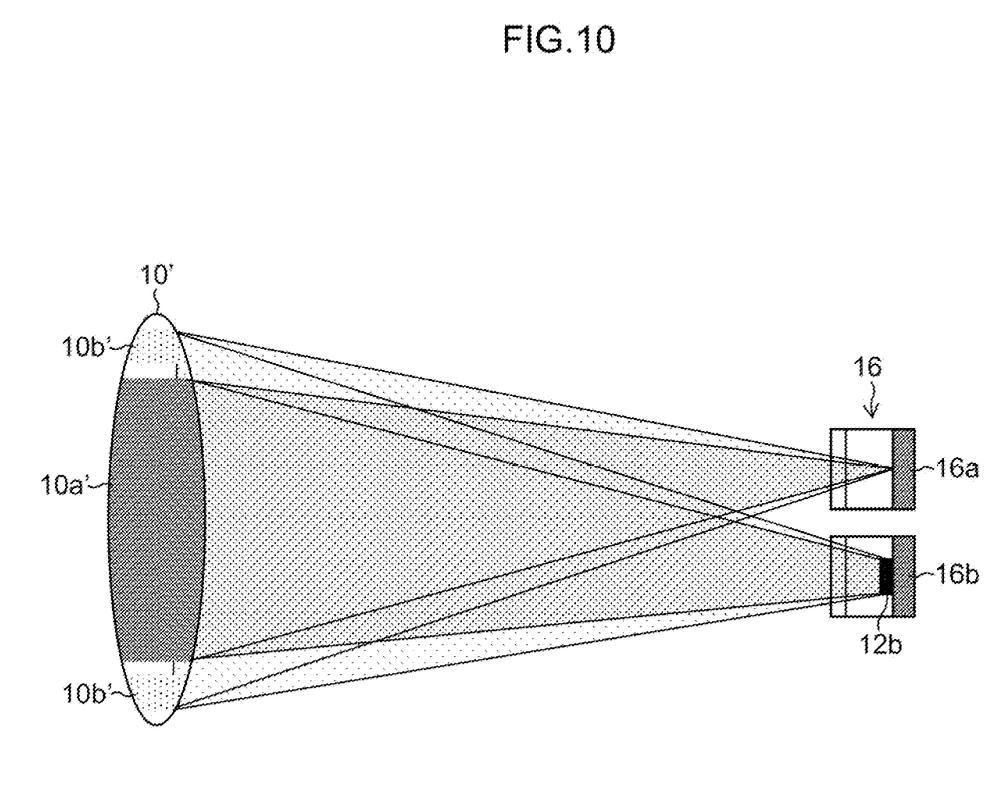
FIG. 10 is a diagram schematically depicting a taking lens, a light-shielding member, and an image pickup device of an imaging apparatus according to a second embodiment of the present invention.

FIG. 10 is a diagram schematically depicting a taking lens 10', a light-shielding mask 12b, and an image pickup device 16' in the second embodiment. The structure of the imaging apparatus other than these elements is similar to that of the imaging apparatus 1 according to the first embodiment, and therefore its description is omitted.

In the second embodiment, the light-shielding mask 12b is disposed on the light-receiving surface of a near-image light-receiving cell 16b' of the image pickup device 16', and the light-shielding mask 12b shields light beams passing through a far focal region 10a' of the taking lens 10'. Therefore, only the light beams passing through a near focal region 10b' enter the near-image light-receiving cell 16b'. With this, in the second embodiment, as with the first embodiment, the number and types of light-shielding members can be reduced, and pupil division can be performed with a simple structure. Also, various products can be easily supported.

Also in the second embodiment, as with the first embodiment described above, when an image is generated from imaging signals of the far-image light-receiving cell 16a' or the near-image light-receiving cell 16b', it is possible to suppress the load on the image processing unit 25 and performance requirements thereof by not performing image processing of removing an influence of light beams entering another light-receiving cell. As a result, design and manufacturing cost of the imaging apparatus 1 can be reduced.

Note that while no microlens is provided also in the present embodiment, as with the first embodiment, a microlens may be provided if there is a problem in space, for example.

Note that while description has been made in the first embodiment (including the first and second modification examples) and the second embodiment described above with the example in which a CMOS is used as an image pickup device, the image pickup device is not restricted to a CMOS. The present invention can be applied also to another image sensor such as a CCD.

Also, in the first embodiment and the second embodiment, a bifocal lens is used as the taking lens 10, the bifocal lens having the center circular far focal region 10a and an annular near focal region 10b. However, the taking lens 10 is not restricted to this mode. For example, a bifocal lens having a center circular near distance region and an annular far distance region may be used, a bifocal lens having focal lenses different between upper and lower halves may be used, a trifocal lens with different focal lengths among a center circular region, its outside annular region, and its further outside annular region may be used, or a multifocal lens with further many different focal lengths may be used.

Furthermore, the taking lens 10 is not restricted to a multifocal lens, and any of various characteristic lens can be used, such as a lens having a plurality of regions with different transmission wavelength ranges. Furthermore, by using the fact that the MTF (Modulation Transfer Function) differs depending on the position of the lens, an image with a different MTF characteristic may be obtained in each of the center circular region and the outside annular region.

Still further, color filters of different colors between the center circular region and the outside annular region may be added to the taking lens 10, and images of different colors may be obtained from the center circular region and the outside annular region.

Note that while the image pickup device has two different directivity characteristics because the taking lens is divided into two region in the first and second embodiments, if the taking lens is divided into three or more regions, the image pickup device is required to also have directivity characteristics of three different types.

While the present invention has been described by using the embodiments, the technical scope of the present invention is not restricted to the range described in the embodiments described above. It is obvious for a person skilled in the art that it is possible to variously change or improve the embodiments described above. It is obvious from the description of the claims that embodiments with such modification or improvement can also be included in the technical scope of the present invention. The present invention is not particularly restricted to an imaging apparatus capable of photographing a plurality of images with different characteristics, but can be applied also to a monocular stereoscopic imaging apparatus which photographs a stereoscopic image with one optical system by pupil division or a phase-difference focus detecting apparatus.

It should be noted that performing processes such as operations, procedures, steps, and stages in the apparatus, system, program, and method described in the claims, specification, and drawings can be achieved in any sequence unless specifically and clearly stated as "before", "prior to", or the like and unless an output from a previous process is used in a subsequent process. Regarding claims, specifications, operation flows in the drawings, even if description is made by using "first", "next", or the like for convenience, this does not mean that it is imperative to perform in this sequence.

What is claimed is:

1. An imaging apparatus comprising:
   a taking lens having a first region with a first characteristic and a second region with a second characteristic different from the first characteristic;
   an image pickup device having a plurality of first light-receiving elements and a plurality of second light-receiving elements two-dimensionally arranged;
   a light-shielding member which shields a light beam passing through the taking lens; and
   an image generating unit which generates an image of a subject from imaging signals of the first light-receiving elements or the second light-receiving elements, wherein
   the light-shielding member is provided only to the first light-receiving elements, and the light-shielding member provided only to the first light-receiving elements performs light shielding so that a light beam passing through the second region does not enter the first light-receiving elements, whereby only a light beam passing through the first region enters the first light-receiving elements and the light beam passing through the first region and the light beam passing though the second region both enter the second light-receiving elements, and
   a ratio of the second region occupying an entire exit pupil of the taking lens is higher than a ratio of the first region occupying the entire exit pupil of the taking lens,
   wherein an image obtained by only the light beam passing through the first region and entering the first light-receiving elements, and an image obtained by both the light beam passing through the first region and the light beam passing through the second region and entering the second light-receiving elements are simultaneously obtained.

2. The imaging apparatus according to claim 1, wherein the ratio of the second region occupying the entire exit pupil of the taking lens is defined so that a characteristic of the image of the subject when an entire region of the exit pupil has the second characteristic is identical to a characteristic of an image of the subject generated from the light beam passing through the second region.

3. The imaging apparatus according to claim 1, further comprising an operating unit which accepts selection as to whether to perform image processing of removing an influence of the light beam passing through the second region when an image of the subject is generated from the imaging signals of the first light-receiving elements and selection as to whether to perform image processing of removing an influence of the light beam passing through the first region when an image of the subject is generated from the imaging signals of the second light-receiving elements, wherein
   the image generating unit performs image processing according to the selection accepted by the operating unit.

4. The imaging apparatus according to claim 1, wherein the light-shielding member is arranged between the taking lens and the image pickup device.

5. The imaging apparatus according to claim 1, wherein the light-shielding member is an optically transparent plate-shape member having a light-shielding part formed on a surface.

6. The imaging apparatus according to claim 1, wherein the light-shielding member is fixed at a position a predetermined distance away from the image pickup device.

7. The imaging apparatus according to claim 1, wherein the light-shielding member is movably arranged in an optical axis direction of the taking lens.

8. The imaging apparatus according to claim 1, wherein the light-shielding member is arranged so as to be able to move in parallel along a plane orthogonal to an optical axis direction of the taking lens.

9. The imaging apparatus according to claim 1, wherein the light-shielding member is a light-shielding mask provided on light-receiving surfaces of the first light-receiving elements.

10. The imaging apparatus according to claim 1, wherein the first and second light-receiving elements are arranged so that a ratio of the first light-receiving elements occupying all light-receiving elements is equal to a ratio of the first region occupying an entire region of an exit pupil of the taking lens.

11. The imaging apparatus according to claim 1, wherein when generating an image of the subject from the output signals of the second light-receiving elements, the image generating unit performs processing of interpolating a pixel dropout of the second light-receiving elements at a position where the first light-receiving elements are disposed.

12. The imaging apparatus according to claim 1, wherein the taking lens is formed of a region with a circular plane shape arranged centering on an optical axis and an annular region arranged on an outer edge of the circular region,
   the annular region is the first region, and
   the circular region is the second region.

13. The imaging apparatus according to claim 1, wherein the first region has a first focal length as the first characteristic, and the second region has a focal length longer than the first focal length as the second characteristic.

14. The imaging apparatus according to claim 1, wherein the ratio of the second region occupying the entire exit pupil of the taking lens is higher than 75%.

15. The imaging apparatus according to claim 1, wherein the ratio of the second region occupying the entire exit pupil of the taking lens is 80% or higher.

16. The imaging apparatus according to claim 1, further comprising an operating unit which accepts selection as to from which of the imaging signals of either of the first light-receiving elements and the second light-receiving elements an image is to be generated.

* * * * *